US008260988B2

(12) United States Patent
Cao et al.

(10) Patent No.: US 8,260,988 B2
(45) Date of Patent: Sep. 4, 2012

(54) PS/2 TO USB KEYBOARD ADAPTOR SUPPORTING N-KEY ROLLOVER

(75) Inventors: Dang Sheng Cao, Richmond (CA); Chang-Ti Sung, Richmond (CA); Wen Zhang, Richmond (CA)

(73) Assignee: Aten International Co., Ltd., Shijr (TW)

( * ) Notice: Subject to any disclaimer, the term of this patent is extended or adjusted under 35 U.S.C. 154(b) by 181 days.

(21) Appl. No.: 12/475,088

(22) Filed: May 29, 2009

(65) Prior Publication Data

US 2010/0306427 A1 Dec. 2, 2010

(51) Int. Cl.
G06F 13/12 (2006.01)
G06F 3/00 (2006.01)

(52) U.S. Cl. ............ 710/67; 710/16; 708/142; 708/146; 361/679.01; 361/679.22

(58) Field of Classification Search ...... 710/67
See application file for complete search history.

(56) References Cited

U.S. PATENT DOCUMENTS

| | | | |
|---|---|---|---|
| 3,792,466 | A | 2/1974 | Arnold et al. |
| 4,106,011 | A | 8/1978 | Melanson et al. |
| 4,359,612 | A | 11/1982 | Rooney |
| 4,517,553 | A | 5/1985 | Engstrom |
| 5,448,236 | A | 9/1995 | Shiga |
| 6,763,408 | B1 | 7/2004 | Sonoda |
| 7,051,149 | B2 | 5/2006 | Wang et al. |
| 7,161,505 | B1 | 1/2007 | Falik et al. |
| 7,256,768 | B2 | 8/2007 | Bathiche |
| 7,711,874 | B1* | 5/2010 | Ilyasov et al. ............ 710/52 |
| 2003/0041205 | A1* | 2/2003 | Wu et al. ............ 710/302 |
| 2005/0057521 | A1* | 3/2005 | Aull et al. ............ 345/172 |
| 2005/0231462 | A1* | 10/2005 | Chen ............ 345/156 |
| 2006/0277335 | A1 | 12/2006 | Chien |
| 2007/0061491 | A1 | 3/2007 | Kerdemelidis et al. |
| 2007/0285393 | A1 | 12/2007 | Ishakov |
| 2010/0228902 | A1* | 9/2010 | Chou et al. ............ 710/306 |

OTHER PUBLICATIONS

Compaq, Universal Serial Bus Specification, Apr. 27, 2000, Revision 2.0, pp. i-iv, 25-44.*
Device Class Definition for Human Interface Devices (HID), Jun. 2001, Version 1.11, pp. 1-97.*
Universal Serial Bus (USB), "Device Class Definition for Human Interface Devices (HID)" Version 1.1, Apr. 7, 1999.
Cypress Semiconductor Corporation, "CY7C63722/23 CY7C63743 enCoRe USB Combination Low-Speed USB & PS/2 Peripheral Controller", Oct. 1, 2002.

* cited by examiner

*Primary Examiner* — Henry Tsai
*Assistant Examiner* — Dean Phan
(74) *Attorney, Agent, or Firm* — Chen Yoshimura LLP

(57) ABSTRACT

A USB converter circuit for converting electrical signals from a key scan circuit (in PS/2 or other formats) into USB signals for a computer while supporting N-key rollover (NKRO) functions. The converter circuit can be implemented as a stand-alone PS/2 to USB keyboard converter or as an integral component of a USB keyboard or KVM switch. The converter circuit includes a converter module that generates keyboard data packets in the USB format having a 16-byte, 64-byte, etc. format representing key press information for up to 8 modifier keys and 14, 62, etc. non-modifier keys, respectively. The converter circuit also includes a USB device controller module which transmits the 16-byte etc. USB keyboard data as one or multiple USB data packets to the host computer. When multiple USB data packets are needed to transmit each keyboard data packet (depending on the USB speed), they are transmitted in consecutive polling periods.

19 Claims, 4 Drawing Sheets

B.1 Protocol 1 (Keyboard)

The following represents a Report descriptor for a boot interface for a keyboard.

```
Usage Page (Generic Desktop),
Usage (Keyboard),
Collection (Application),
    Report Size (1),
    Report Count (8),
    Usage Page (Key Codes),
    Usage Minimum (224),
    Usage Maximum (231),
    Logical Minimum (0),
    Logical Maximum (1),
    Input (Data, Variable, Absolute),        ;Modifier byte
    Report Count (1),
    Report Size (8),
    Input (Constant),                        ;Reserved byte
    Report Count (5),
    Report Size (1),
    Usage Page (LEDs),
    Usage Minimum (1),
    Usage Maximum (5),
    Output (Data, Variable, Absolute),       ;LED report
    Report Count (1),
    Report Size (3),
    Output (Constant),                       ;LED report padding
    Report Count (6),
    Report Size (8),
    Logical Minimum (0),
    Logical Maximum(255),         71
    Usage Page (Key Codes),
    Usage Minimum (0),
    Usage Maximum (255),
    Input (Data, Array),
End Collection
```

| Byte | Description |
|------|-------------|
| 0 | Modifier keys |
| 1 | Reserved |
| 2 | Keycode 1 |
| 3 | Keycode 2 |
| 4 | Keycode 3 |
| 5 | Keycode 4 |
| 6 | Keycode 5 |
| 7 | Keycode 6 |

Note Byte 1 of this report is a constant. This byte is reserved for OEM use. The BIOS should ignore this field if it is not used. Returning zeros in unused fields is recommended.

Fig. 7

PS/2 TO USB KEYBOARD ADAPTOR SUPPORTING N-KEY ROLLOVER

BACKGROUND OF THE INVENTION

1. Field of the Invention

This invention relates to an adapter circuit for a keyboard, and in particular, it relates to an adapter circuit for a keyboard which produces USB (universal serial bus) keyboard signals while supporting N-key rollover (NKRO).

2. Description of the Related Art

Rollover refers to the ability of a computer keyboard to correctly interpret multiple simultaneous keystrokes. During normal typing on a conventional computer keyboard, only one key is typically pressed at any given time. When using modifier keys such as Shift or Control, the user will hold down the modifier key(s) while striking and releasing another key. However, certain unusual forms of keyboarding may require multiple keys to be struck or held down simultaneously. In particular, some computer games require holding down keys (other than the usual modifier keys) while pressing and releasing other keys.

To reduce cost and design complexity, most conventional keyboards do not isolate all keys independent of each other; instead, they use a matrix of key switches that assumes that only a limited number of keys will be held down at any given time. "N-key rollover" refers to a feature of a keyboard that scans each key completely independently by the keyboard hardware, so that each keypress is correctly detected regardless of how many other keys are being pressed or held down at the time. For example, most keyboards have "3-key rollover" and can reliably detect any three keys used simultaneously. However, if the user holds down three keys and attempts to strike a fourth, the keypress may be ignored or incorrectly interpreted. The inability of a keyboard to correctly detect and interpret simultaneously pressed keys is often referred to as key jamming. Some keyboards, such as keyboard designed for playing computer games, especially games played by multiple players, are designed to handle N-key rollover of 10 keys or more.

SUMMARY OF THE INVENTION

The present invention is directed to an adapter (converter) circuit that that produces keyboard signals in the USB format while supporting N-key rollover (NKRO) for a large number of keys.

An object of the present invention is to provide a PS/2 to USB adapter for a PS/2 keyboard while supporting NKRO.

Another object of the present invention is to provide a USB keyboard that supports NKRO.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a signal converter device for a keyboard, which includes: a converter module for receiving electrical signals representing key press information and generating keyboard data packets complying with a USB (universal serial bus) standard, each keyboard data packet having a format of nine bytes or longer and representing up to eight modifier keys and seven or more non-modifier keys; and a USB device controller module for transmitting the keyboard data packets to a USB host, the USB device controller module receiving polling tokens from the USB host and transmitting each keyboard data packet as one or multiple USB data packets in one or multiple consecutive USB polling periods.

In another aspect, the present invention provides a method for converting keyboard signals, which includes: receiving electrical signals representing key press information; generating keyboard data packets complying with a USB (universal serial bus) standard based on the received electrical signals, each keyboard data packet having a format of nine bytes or longer and representing up to eight modifier keys and seven or more non-modifier keys; and transmitting the keyboard data packets to a USB host, wherein each keyboard data packet is transmitted as one or multiple USB data packets in one or multiple consecutive USB polling periods.

In yet another aspect, the present invention provides a KVM (keyboard, video, mouse) switch device, which includes: a converter module for receiving electrical signals representing key press information and generating keyboard data packets complying with a USB (universal serial bus) standard, each keyboard data packet having a format of nine bytes or longer and representing up to eight modifier keys and seven or more non-modifier keys; a plurality of USB device controller modules each for transmitting the keyboard data packets to a USB host, each USB device controller module receiving polling tokens from the corresponding USB host and transmitting each keyboard data packet as one or multiple USB data packets in one or multiple consecutive USB polling periods to the corresponding USB host; and a switch circuit for transferring the keyboard data packets from the converter module to a selected one of the USB device controller modules.

It is to be understood that both the foregoing general description and the following detailed description are exemplary and explanatory and are intended to provide further explanation of the invention as claimed.

BRIEF DESCRIPTION OF THE DRAWINGS

FIG. 7 illustrates a boot interface descriptor for a keyboard according to conventional art.

DETAILED DESCRIPTION OF THE PREFERRED EMBODIMENTS

Figure 1:
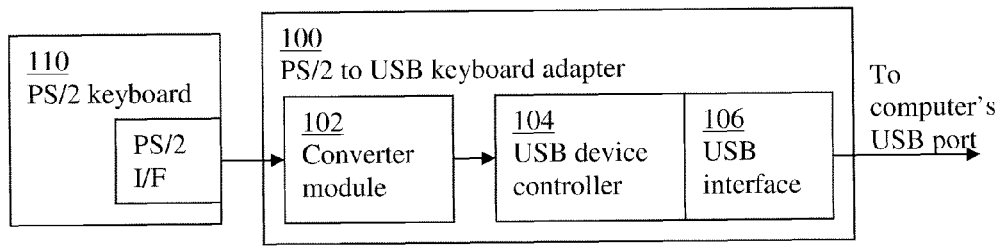
FIG. 1 illustrates a PS/2 to USB adapter connected between a PS/2 keyboard and a computer which supports NKRO according to an embodiment of the present invention.

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment (as well as some alternative embodiments) of the present invention.

PS/2 keyboards and USB keyboards have a number of differences. One difference is that PS/2 keyboards typically use a chipset to decode and process the key stroke signals, and the operation system of the computer receives the decoded key signals directly. A USB keyboard, on the other hand, requires the operating system driver to poll the keyboard and record the key stroke signals. Thus, a PS/2 keyboard requires less system resources of the computer. For a USB keyboard, since the polling interval is fixed, the reaction time of the keyboard is limited. Thus, if super-fast typing is required, the user may feel a lag in the keyboard's response. Since a PS/2 keyboard does not require polling, the keystroke signals are transmitted to the computer without delay.

Another difference is that a USB keyboard typically uses the USB HID (human interface device) protocol. A conventional USB keyboard using the HID protocol can transmit data for up to six ordinary keys (non-modifier keys) and eight modifier keys (left shift, ctrl, alt, win and right shift, ctrl, alt, win) at once. FIG. 7 illustrates a boot interface descriptor for a keyboard according to conventional art, taken from Appendix B, pages 59-60 of "Device Class Definition for Human Interface Devices (HID), Firmware Specification—Apr. 7, 1999, Version 1.1". To the contrary, a PS/2 keyboard transmits signals which directly represent pressing down or releasing of keys, so theoretically signals from a large number of keys can be transmitted to the computer at once. For this reason, keyboards with NKRO functions traditionally use a PS/2 interface to communicate with the computer. As used in this disclosure, N-key rollover (NKRO) refers to the ability to correctly interpret a large number of simultaneous keystrokes, such as more than 6 non-modifier keys or more 14 keys including modifier keys.

Embodiments of the present invention provide a USB adapter (converter) circuit that converts electrical signals generated by a key scan circuit (such as PS/2 signals generated by a PS/2 key scan circuit) into USB signals for the computer while supporting NKRO functions. The converter circuit may be implemented by a logic circuit or as a processor executing firmware or software. The converter circuit may be implemented as a stand-alone PS/2 to USB keyboard converter, as an integral component of a keyboard, or as an integral component of a KVM switch or peripheral device.

As schematically illustrated in FIG. 1, a PS/2 to USB converter circuit may be implemented in a PS/2 to USB keyboard adapter 100 connected between a keyboard 110 and the USB port of a host computer (not shown). The keyboard 110 is a PS/2 keyboard with NKRO function known in the art. The PS/2 to USB keyboard adapter 100 includes a PS/2 to USB converter module 102, a USB device controller module 104 and a USB interface circuit 106. The keyboard signals conforming to the PS/2 standard are inputted to the converter module 102, which converts the PS/2 signals into USB keyboard signals supporting NKRO in a manner described in more detail later. The USB keyboard signals are transmitted to the computer by the USB device controller module 104 via the USB interface circuit 106 in a manner described in more detail later. The physical form of the adapter may be a dongle with a USB cable at one end for plugging into a USB port of the computer and one or more PS/2 cables at the other end for connecting with a PS/2 connector of the keyboard 110, where the converter module 102 and the other circuits are enclosed in a housing physically coupled to or integrated with the cables. The adapter 100 may further include another PS/2 connector for connecting with a PS/2 mouse. The PS/2 to USB converter module 102 and the USB device controller module 104 may be integrated in an IC, such as an IC CY7C63723 supplied by Cypress Semiconductor Corporation.

Figure 2:
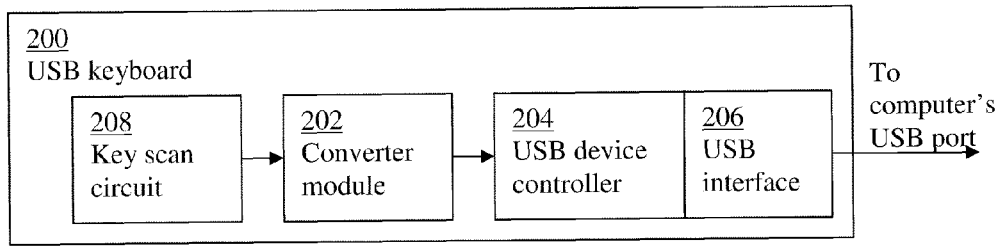
FIG. 2 illustrates a USB keyboard supporting NKRO according to an embodiment of the present invention.

As schematically illustrated in FIG. 2, a USB converter circuit may also be implemented as an integral part of a keyboard 200. The keyboard 200 includes a key scan circuit 208, a converter module 202, a USB device controller module 204 and a USB interface 206. The key scan circuit 208 is capable of scanning each key independently, in a manner similar to a key scan circuit in known PS/2 keyboards with NKRO functions. The electrical signals outputted by the key scan circuit 208, which represent keys being pressed or released, are converted by the converter module 202 to USB keyboard signals supporting NKRO in a manner described in more detail later. The USB keyboard signals are transmitted to the host computer (not shown) by the USB device controller module 204 via the USB interface circuit 206 in a manner described in more detail later. The USB interface 206 may communicate with the computer using a wired or wireless communication method. The converter module 202 and the other circuits are contained within the housing of the keyboard 200. The keyboard 200 also includes other mechanical and electrical structures (not shown) typically found in a computer keyboard, such as keys, etc. The resulting keyboard 200 is a USB keyboard that supports NKRO.

Figure 3:
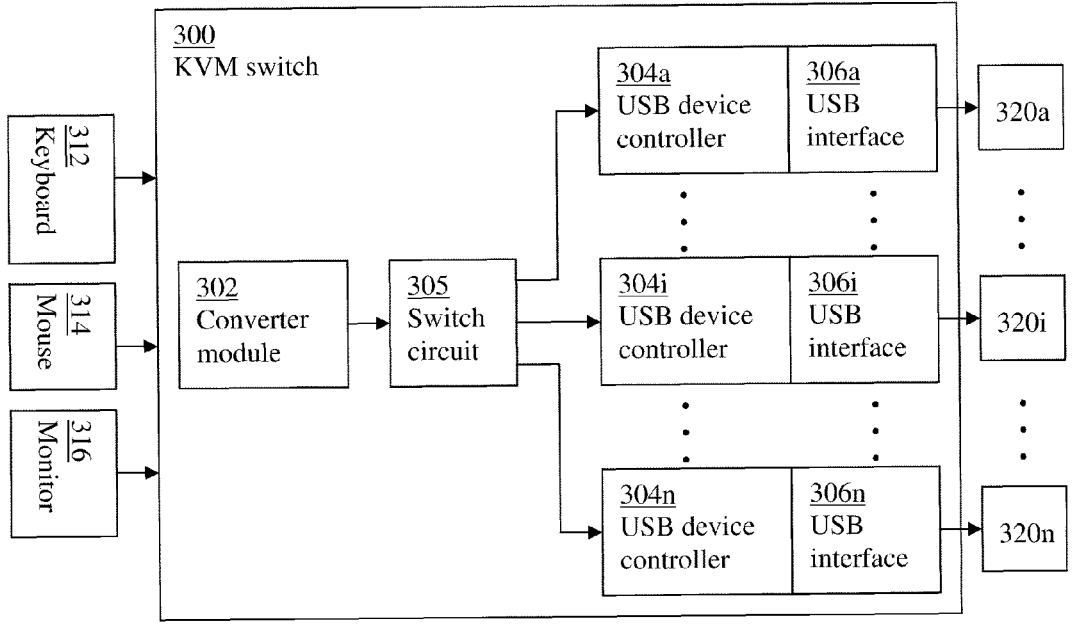
FIG. 3 illustrates a KVM (keyboard, video, mouse) switch supporting NKRO according to an embodiment of the present invention.

As schematically illustrated in FIG. 3, a PS/2 to USB converter circuit may also be implemented as a part of a KVM (keyboard, video, mouse) switch 300. A KVM switch is a device that can be connected to multiple host computers and one or more user consoles to allow each user console to selectively communicate with and control any of the computers. The user console typically includes a monitor, a keyboard and (optionally) a mouse. In the example shown in FIG. 3, the KVM switch 300 is connected to one user console and a number of computers 320a to 320n. The user console includes a keyboard 312, a mouse 314 and a monitor 316. The keyboard 312 is a PS/2 keyboard with NKRO functions known in the art. The KVM switch 300 includes a PS/2 to USB converter module 302, a plurality of USB device controller modules 304a-n, and a plurality of USB interfaces 306a-n. Each set of a USB device controller module 304i and USB interface 306i is coupled to a computer port of the KVM switch for connecting to a computer 320i. The keyboard signals, conforming to the PS/2 standard, are converted by the converter module 302 into USB keyboard signals supporting NKRO in a manner described in more detail later. A switch circuit 305 is connected between the converted module 302 and the plurality of USB device controller modules 304i for switching the converted keyboard signals to the USB device controller module 304i for a selected computer 320i. The USB keyboard signals are transmitted to the selected computer 320i by the USB device controller module 304i via the USB interface circuit 306i in a manner described in more detail later. In an alternative structure (not shown), the KVM switch includes a plurality of PS/2 to USB converter modules each connected before a corresponding USB device controller module 304i, and the switch circuit 305 is coupled between keyboard 312 and the plurality of converter modules.

The keyboard 312 connected to the KVM switch 300 may also be a USB keyboard that supports NKRO (such as the keyboard shown in FIG. 2). In such a case, the PS2 to USB conversion by the converter module can be skipped.

It should be noted that while the preferred embodiment uses a switch circuit 305 to switch the keyboard signals between the keyboard 312 and the computers 320*i*, it is also possible to switch or route the keyboard signals to the computers by using other hardware structures such as a controller, a processor, a CPU, a ASIC, a shift register, combination thereof or any other suitable signal routing techniques.

The switch circuit 305, the converter module 302, the USB device controller module 304*i* and the USB interface 306*i* are contained within the housing of the KVM switch 300. The KVM switch 300 additionally includes other structures (not shown) typically found in a KVM switch. For example, it may include a video switch to switch the video signals (i.e. monitor signals) from the selected computer 320*i* to the monitor 316. It may include one or more mouse signal processing circuits for processing mouse signals received from the mouse 314. The same switch circuit 305 or separate switch circuit switches the input mouse signals from the mouse 314 to the selected computer. The mouse signal may be transmitted to the selected computer 320*i* via the USB device controller module 304*i* and the USB interface circuit 306*i*, or via separate communication channels.

Figure 4:
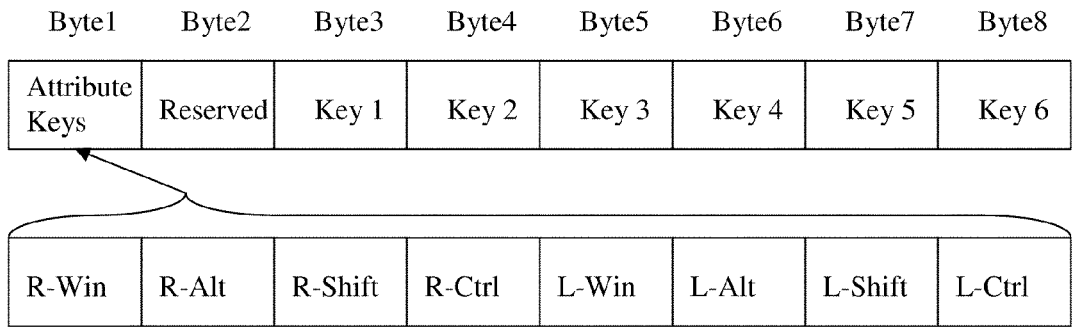
FIG. 4 illustrates a data format for a conventional 8 byte USB keyboard data packet.
Figure 5A:
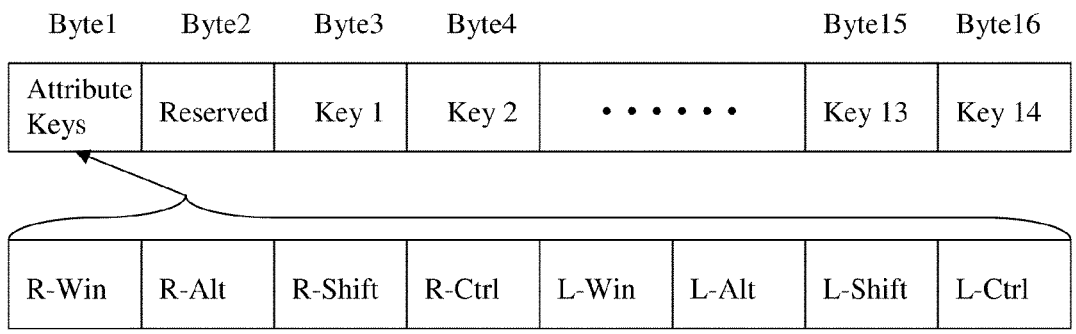
FIGS. 5(a) to 5(c) illustrate data formats for 16 byte, 64 byte and 128 byte USB keyboard data packets, respectively, according to embodiments of the present invention.
Figure 5B:
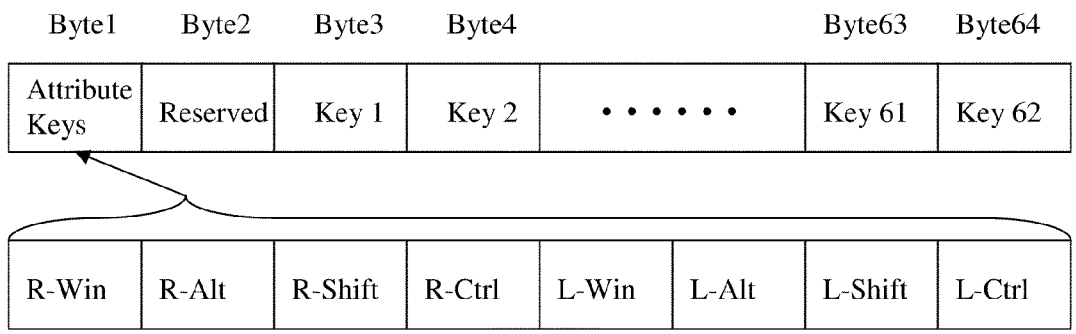
Figure 5C:
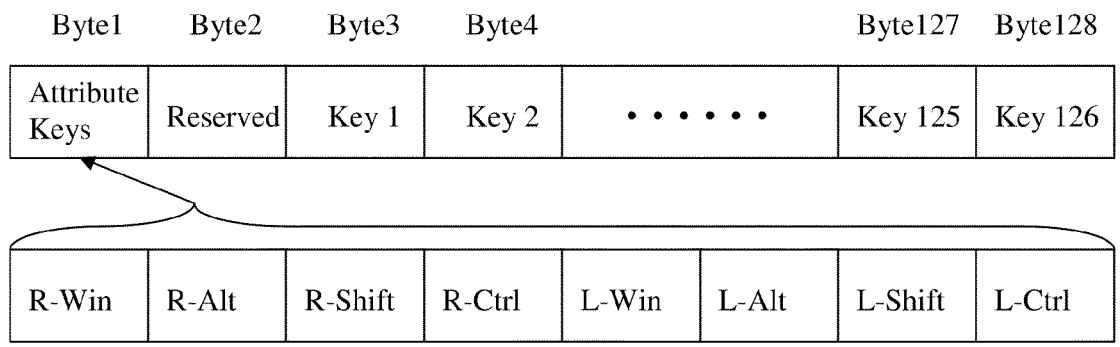

The operations of the converter modules 102/202/302*i* and the USB device controller module 104/204/304*i* are described with reference to FIGS. 4-6.

In a data transmission process between a computer and a conventional USB keyboard using the USB protocol, the computer polls the USB keyboard periodically, such as every 8 milliseconds, by sending an IN token to the keyboard. If the keyboard has no data ready to transmit, the keyboard replies with an NAK (negative acknowledgement) message. If the keyboard has data ready to transmit, the keyboard replies by transmitting 8 bytes of data. The data format for the 8 byte keyboard data packet is schematically illustrated in FIG. 4. The first byte represents eight modifier (attribute) keys, each bit representing one of the modifier keys (R-Win, R-Alt, R-Shift, R-ctrl, L Win, L-Alt, L-Shift, L-ctrl). The second byte is reserved, and the third to eighth bytes represent six non-modifier keys. The 8 byte keyboard data format is determined by the USB HID descriptor. When the USB device controller module in a conventional USB keyboard is initially connected to a computer, the USB host controller in the computer and the USB device controller module in the keyboard perform a USB device enumeration process, during which the USB device controller module presents the device as a USB HID device by transmitting a HID descriptor for an 8 byte keyboard data format. An example of the descriptor for this conventional data format is shown in FIG. 7. In this example, the section of the code indicated by the dashed-line box 71 describes the format of the non-modifier keys; the line of code "Report Count (6)" defines the number of non-modifier keys (one byte each) in a keyboard data packet, which is six in the conventional art.

According to embodiments of the present invention, the USB keyboard data format is modified to support NKRO. Thus, when the USB device controller module 104/204/304*i* is initially connected to the corresponding computer, the USB host controller in the computer and the USB device controller module 104/204/304*i* perform a USB device enumeration process, during which the USB device controller module presents the device as a USB HID device by transmitting a HID descriptor for a 16 byte keyboard data format, or a 64 byte keyboard data format, or a 128 byte keyboard data format, etc. The descriptor used in this enumeration process may be similar to the conventional descriptor shown in FIG. 7, but with appropriate modifications as follows. In the code section that described the non-modifier keys, i.e. the section indicated by the dashed-line box 71 in FIG. 7, the line of code "Report Count (6)" is changed to "Report Count (14)" for a 16 byte keyboard data format, or "Report Count (62)" for a 64 byte keyboard data format, or "Report Count (126)" for a 128 byte keyboard data format, etc. FIGS. 5(*a*) to 5(*c*) schematically illustrate a 16 byte, 64 byte and 128 byte keyboard data format, respectively. The keyboard data packet has 16, 64 or 128 bytes, respectively. The first byte in these data packets still represents the eight modifier keys, and the second byte is still reserved. The third to the last bytes of the keyboard data packet represent 14, 62 and 126 non-modifier keys, respectively. More generally, the keyboard data format (as specified in the HID descriptor) may be any number of bytes greater than 8, which is the number of bytes in a conventional keyboard data descriptor. Thus, the keyboard data format may be 9 bytes, 10 bytes, etc. up to the number of maximum total keys on the keyboard. The keyboard data packet can represent the eight modifier keys and seven or more non-modifier keys. Correspondingly, the conventional HID descriptor may be modified to change the code line "Report Count (6)" to a report count of 7 or greater.

Of course, the conventional USB HID descriptor shown in FIG. 7 and the above-described modifications to the descriptor are merely examples. Other code or messages may be used to communicate, from the USB device controller module to the USB host, the keyboard device description information which specifies the length of the keyboard data packet.

The PS/2 to USB converter module 102/302*i* converts input keyboard data in the PS/2 format received from the keyboard 110/312 into USB keyboard data packets having a length of 16, 64 or 128 byte, etc. Similarly, the converter module 202 converts the electrical signals from the key scan circuit 208 into USB keyboard data packets having a length of 16, 64 or 128 byte, etc. The USB data is fed into the USB device controller module 104/204/304*i*.

Figure 6:
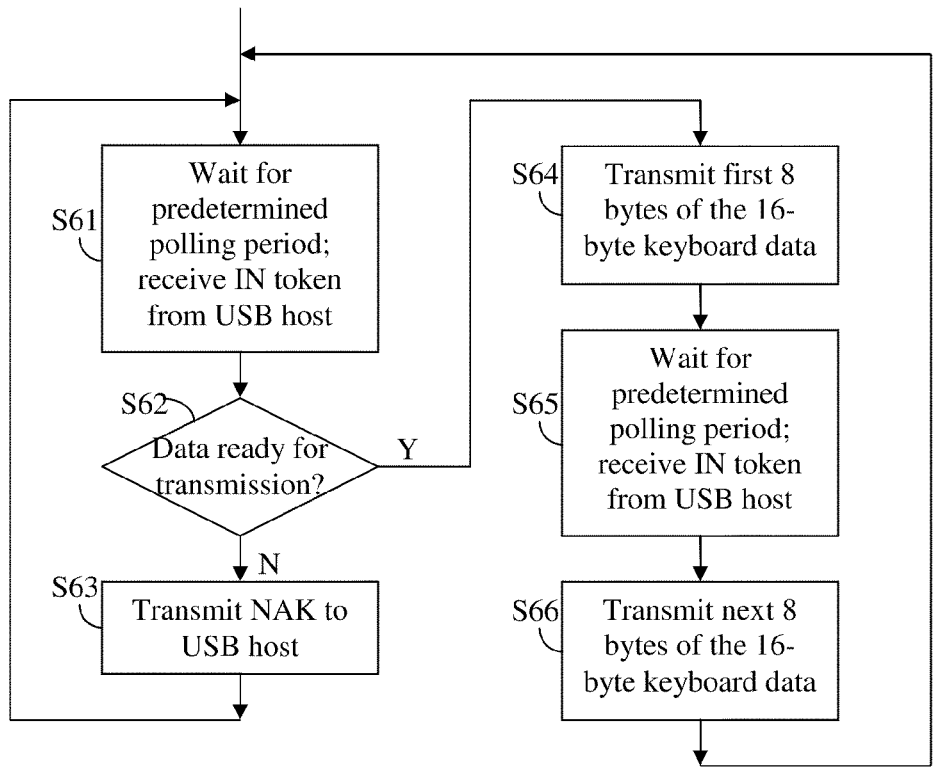
FIG. 6 is a flow chart illustrating a method performed by a USB device controller module transmitting USB keyboard data that supports NKRO according to an embodiment of the present invention.

FIG. 6 is a flow chart illustrating an exemplary data transmission process performed by the USB device controller module 104/204/304*i*. There process is performed after the USB device enumeration process. In this example, the USB device controller module transmits each 16 byte USB keyboard data packet in two consecutive polling cycles, transmitting 8 bytes of keyboard data in each cycle. This is suitable for devices using the low speed USB transmission protocol (1.5 Mbit/s, defined by USB 1.0), where each USB data packet can carry up to 8 bytes of data payload. As shown in FIG. 6, the USB device controller module is polled by the USB host and receives an IN token from the USB host every polling period (e.g. 8 millisecond) (step S61). Upon receiving the IN token, the device controller module determines whether it has data ready for transmission (step S62). If it does not, it transmits an NAK message to the host (step S63). If the device controller module has keyboard data ready for transmission, it transmits the first 8 bytes of a 16-byte keyboard data packet as a USB data packet to the host (step S64). When the next IN token is received after a polling period (step S65), the device controller module transmits the next (last) 8 bytes of the 16-byte keyboard data packets as a USB data packet to the host (step S66). The device controller module then waits for the next IN token from the USB host, and the process (steps S61-S66) repeats.

On the host side, the USB host controller in the computer assembles the 16 bytes of data transmitted in two consecutive polling cycles into one keyboard data packet. The keyboard data packet can represent up to 22 simultaneously pressed keys (8 modifier keys and 14 non-modifier keys). It is noted that no special driver is require on the host. The host, which supports the USB HID protocol, understands the expected length of the keyboard data packet based on the HID descriptor previously received from the USB device controller module, and can correctly assemble the received bytes into the keyboard data packet.

If low speed USB data transmission is used and the keyboard data packet format is longer than 16 bytes (e.g. they are 64 bytes), the USB device controller module can use multiple consecutive polling periods (e.g. 8 polling periods) to transmit all bytes of each keyboard data packet.

When full speed (12 Mbit/s) USB transmission is used, the data payload of each USB data packet is up to 64 bytes. Thus, the USB device controller module 104/204/304*i* can transmit the entire keyboard data packet of a 16-byte or 64-byte format in a single USB data packet. Thus, the process shown in FIG. 6 can be simplified such that step S64 transmits all 16 or 64 bytes of the keyboard data to the USB host, and steps S65 and S66 are eliminated. If full speed USB transmission is used and the keyboard data packets are longer than 64 bytes (e.g. they are 128 bytes), then the keyboard data packet is transmitted in multiple consecutive polling periods.

When high speed (480 Mbit/s, defined by USB 2.0) USB transmission is used, the data payload of each USB data packet is up to 1024 bytes. Thus, the USB device controller module 104/204/304*i* can transmit the entire keyboard data packet of a 16-byte, 64-byte or 128-byte format in a single USB data packet (i.e. transmit 16, 64 or 128 bytes in step S64, and eliminate steps S55 and S56).

Because the USB format is used to transmit the keyboard data to the computer, the keyboard adapter 100, keyboard 200 and KVM switch 300 are compatible with many operating systems that have default USB keyboard drivers or are installed with a special driver.

It will be apparent to those skilled in the art that various modification and variations can be made in the PS/2 to USB keyboard adaptor and related methods of the present invention without departing from the spirit or scope of the invention. Thus, it is intended that the present invention cover modifications and variations that come within the scope of the appended claims and their equivalents.

What is claimed is:

1. A signal converter device for a keyboard, comprising:
   a converter module configured to receive electrical signals representing key press information and generating keyboard data packets, each keyboard data packet having a format of nine bytes or longer and simultaneously representing up to eight modifier keys and seven or more non-modifier keys; and
   a USB (Universal Serial Bus) device controller module configured to transmit the keyboard data packets to a USB host, and to transmit a keyboard device descriptor to the USB host, the keyboard device descriptor including a parameter specifying the keyboard data packet format of nine bytes or longer, the USB device controller module receiving polling tokens from the USB host and transmitting each keyboard data packet as one or multiple USB data packets, each USB data packet complying with a USB transmission protocol, the one or multiple USB data packets being transmitted in one or multiple consecutive USB polling periods,
   wherein a number of the USB data packets is determined by a number of bytes of the keyboard data packet format and a number of bytes of data payload in each USB data packet defined by the USB transmission protocol.

2. The signal converter device of claim 1, wherein the electrical signals comply with a PS/2 standard.

3. The signal converter device of claim 2, further comprising:
   a PS/2 connector for connecting with a PS/2 connector of an external keyboard;
   a USB connector for connecting with a USB connector of the USB host; and
   a housing physically coupled to or integrated with the PS/2 connector and the USB connector,
   wherein the electrical signals are received by the converter module via the PS/2 connector and the USB data packets are transmitted to the USB host via the USB connector.

4. The signal converter device of claim 1, further comprising a key scan circuit coupled to the converter module for generating the electrical signals representing key press information.

5. The signal converter device of claim 4, further comprising a housing, wherein the converter module, the USB device controller module and the key scan circuit are enclosed within the housing.

6. The signal converter device of claim 1, comprising a plurality of converter modules and a plurality of USB device controller modules, further comprising:
   a signal input port for receiving the electrical signals from an external keyboard; and
   a switch circuit for transferring the electrical signals from the signal input port to a selected one of the converter modules.

7. The signal converter device of claim 6, further comprising a housing, wherein the plurality of converter modules, the plurality of USB device controller modules and the switch circuit are enclosed within the housing.

8. The signal converter device of claim 1, wherein the format of the keyboard data packet is 16 bytes.

9. The signal converter device of claim 1, wherein the format of the keyboard data packet is 64 bytes.

10. The signal converter device of claim 1, wherein a first byte of the keyboard data packet represent eight modifier keys.

11. The signal converter device of claim 1, wherein the USB device controller module communicates with the USB host using a low speed USB transmission standard and wherein the USB device controller module transmits each keyboard data packet in multiple consecutive polling periods.

12. A method for converting keyboard signals, comprising:
   (a) receiving electrical signals representing key press information;
   (b) generating keyboard data packets based on the received electrical signals, each keyboard data packet having a format of nine bytes or longer and simultaneously representing up to eight modifier keys and seven or more non-modifier keys;
   (c) transmitting to a USB (Universal Serial Bus) host a keyboard device descriptor which includes a parameter specifying the keyboard data packet format of nine bytes or longer; and
   (d) transmitting the keyboard data packets to a the USB host, wherein each keyboard data packet is transmitted as one or multiple USB data packets, each USB data packet complying with a USB transmission protocol, the one or multiple USB data packets being transmitted in one or multiple consecutive USB polling periods,
   wherein a number of the USB data packets is determined by a number of bytes of the keyboard data packet format and a number of bytes of data payload in each USB data packet defined by the USB transmission protocol.

13. The method of claim 12, wherein the electrical signals comply with a PS/2 standard.

14. The method of claim 12, further comprising generating the electrical signals representing key press information using a key scan circuit.

15. The method of claim 12, wherein the format of the keyboard data packet is 16 bytes.

16. The method of claim 12, wherein the format of the keyboard data packet is 64 bytes.

17. The method of claim 12, wherein a first byte of the keyboard data packet represent eight modifier keys.

18. The method of claim 12, wherein the transmitting step uses a low speed USB transmission standard and wherein each keyboard data packet is transmitted in multiple consecutive polling periods.

19. A KVM (keyboard, video, mouse) switch device, comprising:

a converter module configured to receive electrical signals representing key press information and generating keyboard data packets, each keyboard data packet having a format of nine bytes or longer and simultaneously representing up to eight modifier keys and seven or more non-modifier keys;

a plurality of USB (Universal Serial Bus) device controller modules each configured to transmit the keyboard data packets to a USB host, and to transmit a keyboard device descriptor to the USB host, the keyboard device descriptor including a parameter specifying the keyboard data packet format of nine bytes or longer, each USB device controller module receiving polling tokens from the corresponding USB host and transmitting each keyboard data packet as one or multiple USB data packets, each USB data packet complying with a USB transmission protocol, the one or multiple USB data packets being transmitted in one or multiple consecutive USB polling periods to the corresponding USB host, wherein a number of the USB data packets is determined by a number of bytes of the keyboard data packet format and a number of bytes of data payload in each USB data packet defined by the USB transmission protocol; and a switch circuit for transferring the keyboard data packets from the converter module to a selected one of the USB device controller modules.

\* \* \* \* \*